United States Patent [19]

Jacobs et al.

[11] Patent Number: 4,728,005
[45] Date of Patent: Mar. 1, 1988

[54] SELF-FILL SYSTEM

[75] Inventors: Leonard Jacobs, Chestnut Hill; William Arzberger, Medfield; Peter Coppola, Burlington; Thomas A. O. Gross, Lincoln, all of Mass.

[73] Assignee: Jet Spray Corp., Norwood, Mass.

[21] Appl. No.: 865,141

[22] Filed: May 20, 1986

Related U.S. Application Data

[63] Continuation of Ser. No. 590,992, Mar. 19, 1984, abandoned.

[51] Int. Cl.⁴ ............................................. B67D 5/56
[52] U.S. Cl. ...................................... 222/64; 222/65; 222/129.1; 73/304 R; 137/392
[58] Field of Search ............... 222/129.1, 129.2, 129.3, 222/129.4, 64, 65; 73/304 R; 137/215, 216, 392

[56] References Cited

U.S. PATENT DOCUMENTS

| | | | |
|---|---|---|---|
| 1,398,270 | 11/1921 | Nickum | 73/304 R X |
| 2,595,937 | 5/1952 | Graham | 137/216 |
| 3,225,965 | 12/1965 | Jacobs et al. | 222/129.1 |
| 3,461,722 | 8/1969 | Martens | 73/304 R |
| 3,528,587 | 9/1970 | Popinski | 222/129.1 |
| 3,643,835 | 2/1972 | Popinsky | 222/56 |
| 3,741,683 | 6/1973 | McTamaney et al. | 137/492 X |
| 3,935,970 | 2/1976 | Spaw | 222/56 |
| 4,106,671 | 8/1978 | Sharples | 222/64 X |
| 4,284,343 | 8/1981 | Junghanns | 354/318 |
| 4,390,793 | 6/1983 | John | 307/118 |

FOREIGN PATENT DOCUMENTS

0008095 8/1979 European Pat. Off. .
1473088 11/1968 Fed. Rep. of Germany .
2505238 8/1975 Fed. Rep. of Germany .
2927066 1/1980 Fed. Rep. of Germany .

Primary Examiner—Joseph J. Rolla
Assistant Examiner—Frederick R. Handren
Attorney, Agent, or Firm—Wolf, Greenfield & Sacks

[57] ABSTRACT

In connection with a beverage dispensing machine, an automatic self-fill control apparatus for the machine for controlling the filling of the liquid tank, which liquid tank is fed with a combination of water and a concentrate syrup adapted to be mixed with the water within the tank. A sensor member is disposed in the tank in a position so as to be responsive to the rise and fall of liquid in the tank. Pump means are provided adapted to pump the syrup to the tank. Control of water flow to the tank is also carried out. The sensor member has a low probe for detecting a low predetermined level of liquid in the tank and a high probe for detecting a high predetermined level of liquid in the tank and adapted to respectively generate low and high probe signals. Control circuit means is provided receiving and responsive to these low and high probe signals for controlling the pump to operate when the low probe is uncovered and terminating the pumping action when the liquid level reaches the high probe position so that the liquid level in the tank is always maintained at a level between the low and high probes. Also provided is a third sensor for determining an unsafe condition referred to herein as a system override to shut the system down in the event that the high probe is covered and that the liquid level proceeds to the even higher third probe. Also in the system of the present invention, there is provided a sensor for detecting an out-of-syrup condition.

32 Claims, 6 Drawing Figures

SELF-FILL SYSTEM

This application is a continuation of application Ser. No. 590,992, filed 3-19-84, now abandoned.

BACKGROUND OF THE INVENTION

The present invention relates very generally to liquid dispensing machines and pertains, more particularly, to automatically controlled apparatus for providing for self-fill of the tank of a dispensing machine. Even more particularly, the invention relates to an automatic self-fill apparatus embodied in control circuit means for use with a machine that dispenses a liquid comprised of water and a concentrate syrup adapted to be jointly fed to a tank of the machine.

Machines that dispense a beverage are typically comprised of a tank for the storage of a beverage. The beverage is typically made up of a mixture of water and a concentrate syrup maintained at a cool temperature by means of evaporation cooling coils. These machines may have a water inlet feed but for the most part, the beverage in the storage tank of the dispenser is replenished by means of emptying a container of the syrup concentrate into the tank when the tank is sufficiently low to enable the tank to receive the full amount of concentrate in the concentrate container. Water is then added in an appropriate amount to provide the proper concentration of the beverage. This normal operation of replenishing the beverage in the tank is relatively messy to carry out and is time consuming. This prior technique is also a drawback in that the machine is required to be out of operation for a period of time while the replenishment takes place. Also, in replenishing the beverage it is necessary to wait a significant period of time until the entire content of the tank is cooled to serving temperature.

Accordingly, it is an object of the present invention to provide an improved dispensing machine for beverages in which the dispenser is automatically filled. This means that a relatively large syrup concentrate reservoir can be used with the concentrate being replenished and supplied into the storage tank on a demand basis.

Another object of the present invention is to provide an automatic self-fill apparatus for a dispensing machine in which the fill operates in an automatic fashion so as to maintain the level of the beverage within a certain range in the tank. This normally maintains the beverage between set upper and lower limits as far as the level of beverage in the tank of the dispensing machine is concerned.

A further object of the present invention is to provide an automatic self-fill apparatus for a dispensing machine which is safe in operation, is relatively easy to maintain, and which can be incorporated into the dispensing machine relatively inexpensively. In accordance with the present invention, it is preferred to have a safety override so that even should the upper level limit be exceeded, there is an override mechanism by which the machine can be shut down for servicing or to take other action.

Still another object of the present invention is to provide an automatic self-fill apparatus further having the feature of achieving automatic-fill with an adjustable, consistent proportioning of syrup to water and thus provide the desired concentration of the beverage.

SUMMARY OF THE INVENTION

To accomplish the foregoing and other objects of this invention, there is provided an automatic self-fill apparatus for a machine that dispenses beverages which are generally comprised of water and a concentrate syrup which are adapted to be mixed-together within a tank of the dispensing machine. The apparatus of the present invention comprises a sensor member disposed in the tank in a position so as to be responsive to the rise and fall of liquid in the tank. The sensor member preferably comprises a support post disposed in an upright position in the tank. Pump means are provided to pump the syrup to the tank. Water control means is also provided such as a water solenoid valve for controlling water flow to the tank. The lines that couple to the tank preferably include fill pipes that are adapted to feed the water and syrup concentrate to a top end of the tank. The sensor member comprises probes which include a low probe for detecting a low predetermined level of liquid in the tank and a high probe for detecting a high predetermined level of liquid in the tank and adapted to respectively generate low and high probe signals. Control circuit means is used responsive to the low and high probe signals for controlling the pump and water fill valve to operate when the low probe is uncovered and terminating pumping action when the liquid level reaches the high probe position, thereby maintaining the liquid level in the tank at a level between the low and high probes at all times. There is preferably also provided a third probe disposed over the high probe and functioning as a system override whereby the control circuit means is disabled to shut the apparatus down in the event that the liquid level exceeds the high probe position and reaches the system override probe.

When one is out-of-syrup then it is not desired to provide any additional pumping into the tank until the syrup can be replenished. In this way the liquid in the tank is not diluted.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1A:
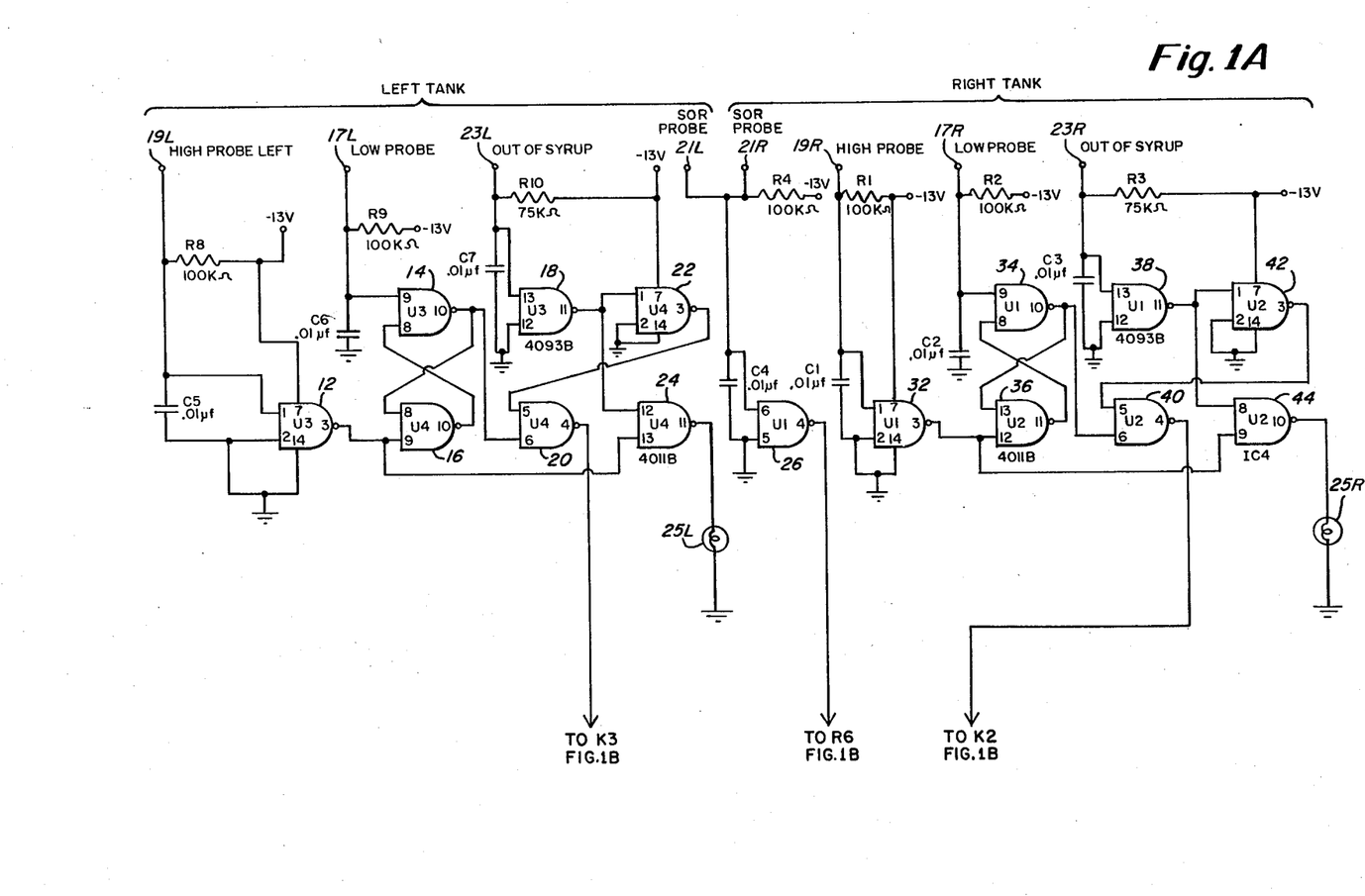
FIGS. 1A and 1B illustrate logic control circuitry for providing automatic self-fill in connection with a dispensing machine such as one that dispenses fruit juices or other beverages.
Figure 1B:
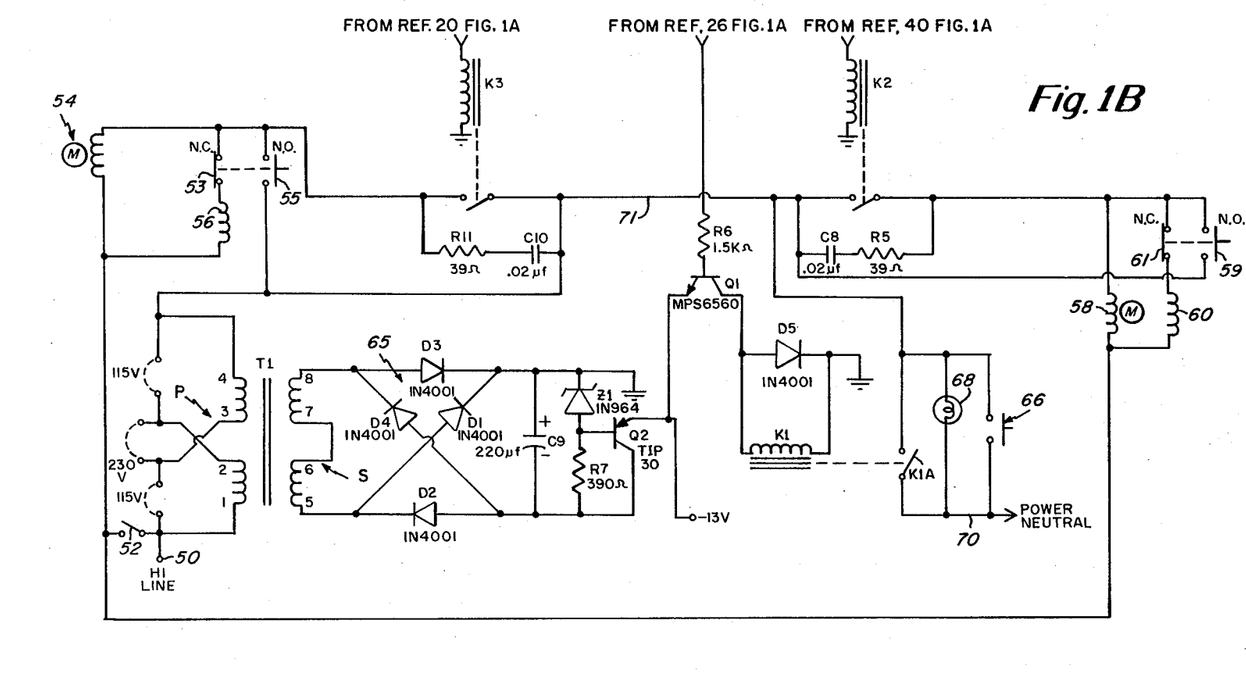
Figure 2:
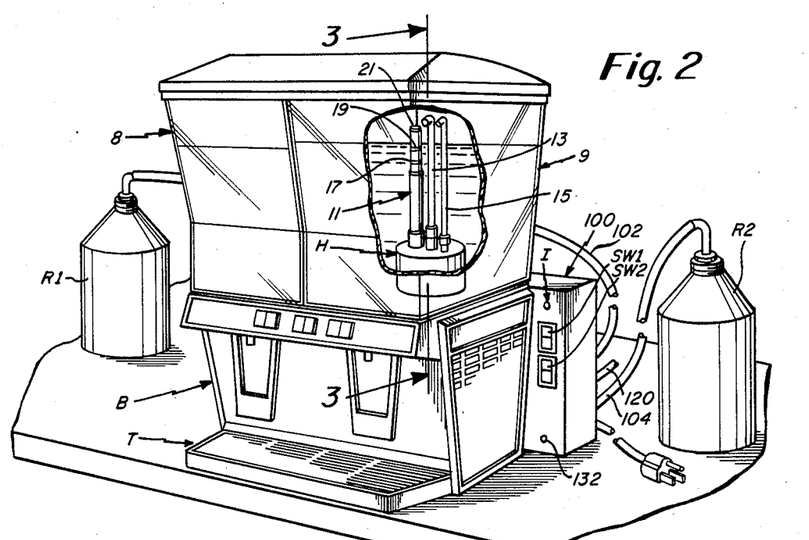
FIG. 2 is a front perspective view of a twin tank dispensing machine with one of the tanks partially cut away to illustrate the fill pipes and probe assembly as in accordance with the present invention.
Figure 3:
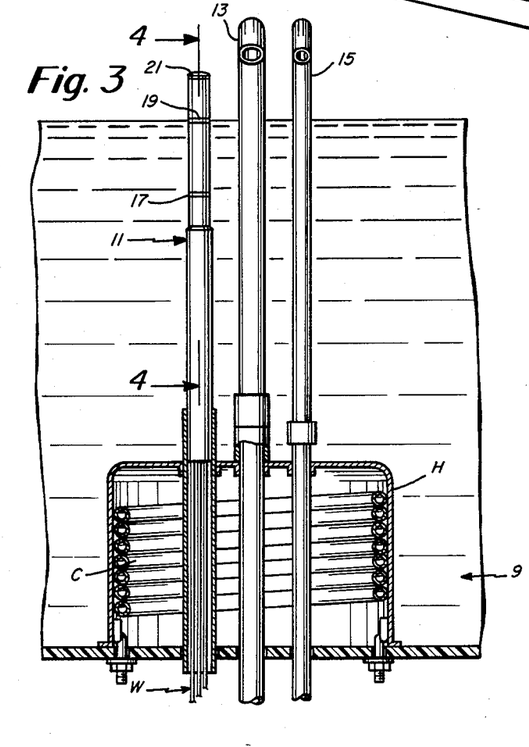
FIG. 3 is a cross-sectional view taken along line 3—3 of FIG. 2 showing further details of the fill pipe and probe assembly.
Figure 4:
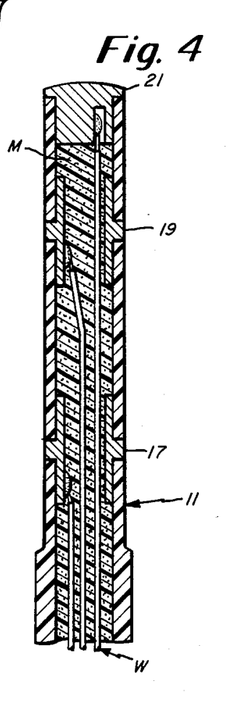
FIG. 4 is a further cross-sectional view taken along line 4—4 of FIG. 3 showing the probe.
Figure 5:
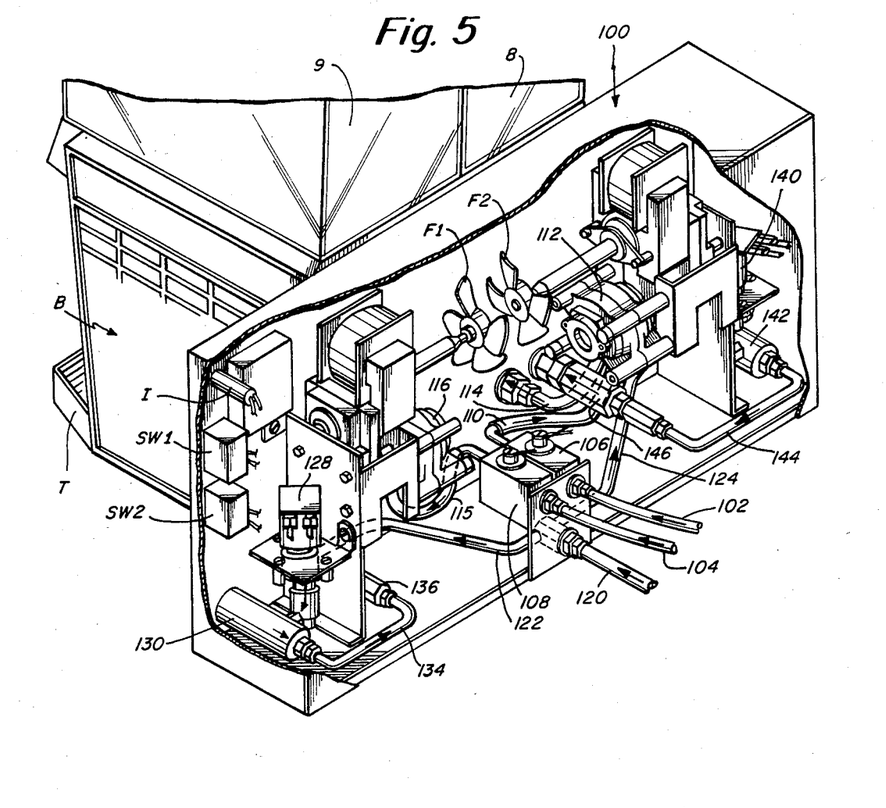
FIG. 5 is a rear perspective view of the dispensing machine illustrated in FIG. 2.

With reference to the drawing, there is depicted in FIGS. 1A and 1B the control circuitry of the present invention for providing the automatic self-fill in connection with a dispensing machine. The dispensing machine with which the concepts of the invention are practiced may be of the general type depicted in FIGS. 2-5 herein, although, the concepts of the invention may also be practiced with many other forms of dispensing machine. FIGS. 2-5 herein illustrate the preferred embodiment of the automatic self-fill dispensing machine in accordance with the present invention. In this connection FIG. 2 illustrates a front perspective view of the twin tank dispensing machine with one of the tanks partially cut away to illustrate the fill pipes and probe assembly. FIG. 3 is a cross sectional view taken along line 3—3 showing further details thereof. FIG. 4 is a further cross sectional view taken along line 4—4 of FIG. 3 showing further details of the probe assembly. FIG. 5 is a rear perspective view of the dispensing machine with the housing cut away.

FIGS 1A and 1B show logic control circuitry for providing automatic self-fill in connection with a dispensing machine such as one that dispenses flavored fruit beverages. A portion of the control circuitry may be separated into two sections; one associated with a left liquid tank 8 and the other associated with a right liquid tank 9. Each of these tanks has associated therewith basically three probes the physical arrangement of which is depicted in FIGS. 2-4. In this regard there is provided in each tank a support post 11 illustrated, for example, in FIG. 3, disposed between two fill pipes 13 and 15. These fill pipes are for respectively receiving water and the syrup concentrate. On the support post 11 there are provided probes including a low probe ring 17, a high probe ring 19, and a top probe cap 21 which is for a system override function. In connection with the control circuitry the different probes are identified at the input control terminals by like reference characters. In addition there is also provided an out-of-syrup probe 23 which operates to provide an indication when the main syrup reservoir is empty. It is also noted that as depicted in FIGS. 2-4 that the details are given of the low probe ring 17, high probe ring 19, and top probe cap 21.

Prior to discussing the operation of the circuitry of FIGS. 1A and 1B reference is now made to FIG. 2 which shows the dispensing machine with its base B and associated drip tray T upon which a cup can rest under either one of the dispensing nozzles. There is, of course, a dispensing nozzle associated with each of the tanks 8 and 9. Also depicted in FIG. 2 is a first syrup concentrate reservoir R1 and a second syrup concentrate reservoir R2. FIG. 1 also illustrates an indicator I and switches SW1 and SW2. The indicator I is an out-of-syrup light. The switch SW1 is a prime switch to be discussed in detail hereinafter in connection with the circuit diagram. The switch SW2 (switch 52 in FIG. 1B) is a power switch for enabling automatic filling.

FIG. 3 shows the fill pipes 13 and 15 along with the support post 11 which comprises part of the overall probe assembly. FIG. 3 also shows the probe rings 17, 19, and probe cap 21. The fill pipes and the support post 11 are all mounted from the evaporator coil housing H. In FIG. 3 the evaporator coils C are shown. Also shown in FIG. 3 are the three wires at W which couple from the respective probe rings. Again, further reference is made hereinafter to the probes and their operation in conjunction with the overall circuitry.

In the following discussion of the operation of the circuitry, a distinction is made between the left and right probes and associated fill pipes and in this connection, the suffixes L and R are used in association with the reference characters.

In connection with FIG. 3, it is to be noted that the construction of the evaporator section is well known with the exception that in accordance with the present invention the evaporator housing is also used in a dual manner as a support for the fill pipes and the probe assembly.

It is also noted in FIG. 3 that the water fill pipe 13 preferably extends from the evaporator housing at the middle thereof. This is desired so that the evaporator coils C do not interfere with the water flow. If this line is located too close to the evaporator coils C, then freezing of the water may occur.

FIG. 4 shows the cross sectional details of the probe assembly. The majority of the probe assembly is made of an insulating dielectric material with the exception of the probe contacts which are conductive. FIG. 4 shows the wiring W individually connecting to the probe contacts such as by being soldered-thereto. A filler material M may then be used to seal everything together. This may be epoxy.

FIG. 5 shows further details of the rear of the dispenser which includes a housing 100 for containing and supporting many of the components used in completing the system. Previously, reference has been made to the syrup reservoirs R1 and R2. The line 102 couples from the syrup reservoir associated with the left tank while line 104 couples from the syrup reservoir associated with the right tank. The line 102 connects to a left tank syrup sensor 106 while the line 104 couples to a right tank syrup sensor 108. The details of the syrup sensor are found in a co-pending application. Basically, each of the probe electrodes 23L and 23R in sensors 106 and 108, respectively, detects the presence of syrup in the respective lines 102 and 104. When the reservoirs are out of syrup then the out-of-syrup sensors give an indication of such which is coupled to the circuitry shown in FIGS. 1A and 1B.

From sensor 106 there is a line 110 which couples to the left tank peristaltic pump 112. A further line 114 connects from the output of the pump to the left tank to one of the syrup pipes 15L. Similarly, the output of the sensor 108 couples by way of a line 115 to the peristaltic pump 116 associated with the right hand tank. A further line not shown in FIG. 5 couples from the output of the pump 116 to the syrup fill tube 15R located in a right hand tank 9.

A water inlet is also shown in FIG. 5 at water line 120. This line splits into lines 122 and 124. The line 122, for example, couples to the solenoid valve 128. The output of the solenoid valve 128 couples to a water flow control device 130. Associated with the flow control device 130 is a water adjustment 132 shown in FIG. 2. This is used to adjust the volume of water flow to the output line 134 and the check valve 136. The water then enters the water fill tube 13R and then enters the right tank 9.

On the left hand side there is a similar set up in which the line 124 couples to the solenoid valve 140. The output of the solenoid valve 140 couples to the water flow control device 142 which also has an associated water adjustment on the front panel. The output line 144 couples from the output of the water flow control device 142 to the check valve 146 and from there to the water fill pipe 13L in the left tank.

There are basically two reasons for the above described fill apparatus. One is interested in maintaining a sanitary environment and is thus concerned with any back siphoning of a beverage into a water line if the supply line pressure fails and a vacuum occurs. If a below level entry were used, a product could be drawn into the water line, unless a highly restrictive and expensive double ball valve were employed. In case the operator forgets to replace the inlet lines, a single ball check valve is located at the inlet to the unit. Thus, this illustrates one of the features described herein of providing fill pipes in which the liquid filling occurs in a position wherein liquid presently in the tank cannot pass back into the fill lines. This is clearly illustrated in FIG. 2 herein, wherein the fill pipes 13 and 15 extend above the top of the probe assembly. Thus, by providing the fill pipes having their outlet above the top of the probe assembly, back siphoning is not possible. Also, the apparatus can be made more simply, not requiring the use of an expensive double ball valve to prevent the product from being drawn into the water line.

A second reason for tne above-beverage level inlets for water and syrup is the ease that the Brix or water syrup ratio is checked. One can merely place a bifurcated measuring cup under the syrup and water line outlets and catch the water and syrup flow, or catch both in a single glass and check the Brix with a refractometer. Brix adjustment is easily made by adjusting the water flow screw, such as the screw 132 shown in FIG. 2, located at the bottom front on each side of the unit. Control via screw 132 controls the water/syrup ratio by permitting more or less water flow during the filling sequence.

Also depicted in FIG. 5 are a series of fans F1 and F2 which are used for cooling the pump motor. Also shown are switches SW1 and SW2 along with the indicator I. In addition to the switches and indicators shown in FIGS. 2 and 5, on the opposite or left hand side of the unit there is also an indicator associated with an out-of-syrup sensor associated with the reservoir R1. There are also a pair of switches on that side including a prime switch associated with the left tank and the reset switch.. There is also a water flow adjustment port associated with the left tank in the same position as the adjustment 132 shown in FIG. 2 but on the corresponding side of the dispenser.

As indicated previously, the dispensing unit includes four switches, two on each side, such as depicted by switches SW1 and SW2 in FIG. 2. As will be described hereinafter, the reset switch comprises a portion of the system override (SOR) circuitry which shuts down the unit if the beverage level rises to the system override probe cap 21. The logic in the system overrice circuit also deactivates the unit after a power failure and of course, when the unit is first plugged in and started. For the moment it is assumed that the system override circuit has been reset and the power supply is energized.

The circuit diagram also shows the high line 50 coupling to a transformer T1 which has a primary winding P and a secondary winding S. The output from the secondary winding couples to a full wave rectifier bridge circuit 65 comprised of diodes D1-D4. The output from this circuit couples to filter capacitor C9 and to the zener diode Z1, resistor R7 and transistor Q2. A sufficient DC voltage is established at the base of transistor Q2 so as to enable transistor Q2 to be conductive. Basically the power supply may be considered as an emitter follower circuit driven by a Zener diode shunt regulator. Further assuming that the system override function has not taken place, then transistor Q1 is also conductive; this then provides power to the relay K1 which has a diode D5 coupled there across. The circuit diagram also shows a momentary action reset switch 66 and an associated indicator lamp 68. This may be a neon discharge lamp with a series resistor. The power neutral at line 70 couples to both the reset switch 66 and the indicator 68. The line 70 also couples to one side of contact K1A associated with relay coil K1.

At an initial phase of operation the reset switch 66 is closed provide a path from the neutral line 70 through line 71 to the primary winding P of the transformer T1. This causes the AC power to be coupled to the rectifier bridge 65 and in turn provides DC power to the transistors Q1 and Q2 causing energization of the relay K1 and closure of its associated contact K1A. This latches the power circuit.

Reference is now made to the portion of the control circuitry associated with the left tank 8 and with the relay coil K3. This control circuitry includes gates 12, 14, 16, 18, 20, 22, 24 and a common gate 26. All of these gates are NAND gates. The gates 12, 14, 18 and 26 have associated therewith input capacitors C5, C6, C7 and C4, respectively. These gates provide for Schmitt triggering hysteresis inherent in the 4093 chip that is used. The Schmitt trigger action is provided at the probe input terminals so as to stabilize the logic particularly as the probes gradually dry upon a condition of a receding liquid level. The gates 14 and 16 are cross-coupled to form a bistable or flip-flop device.

Thus, the high probe terminal 19L couples to the NAND gate 12; the low probe terminal 17L couples to the NAND gate 14; the out-of-syrup terminal 23L couples to the NAND gate 18; and the override probe 21L couples to the NAND gate 26. It is noted that each of these probe input circuits also includes a resistor such as the respective resistors R8, R9, R10 and R4 each coupling to the negative voltage supply. The NAND gates that are used have a logic low output when both inputs are at a logic high and alternatively they have a logic high output when either or both of the inputs are at a logic low level. In connection with the logic that is described herein the gates are connected to the liquid level probes and the probes are grounded by contact with the liquid. In the absence of the conductive liquid, these probes are driven to the negative voltage such as the −13 volts shown by means of the aforementioned resistors.

In the logic circuit that is depicted the ground level signal corresponds to a logic high or logic "1" and the signal −13 volts corresponds to the logic low or logic "0". The ground voltage has been used for logic high to prevent electrolysis corrosion of the probe electrodes by driving them at a negative voltage with respect to the liquid. The probes are cathodes which are protected by a cathodic protection principle.

In connection with the operation of the control circuit, it may first be considered that, at start-up, there is no liquid in the dispenser (tank). Thus, each of the four liquid sensing probes is ungrounded and the input to each of the corresponding gates 12, 14, 18 and 26 is at its low level (−13 volts). The outputs of these gates are thus at their high level or logic "1" (0 volts). The high output from gate 14 cross-couples to one input from gate 16 and the output from gate 16 is thus low because both of its inputs are high. The high output from gate 14 also couples to gate 20. The high output from gate 18 is converted into a low output at the output of gate 22. This, in turn, causes a high output from the gate 20 which in this logic is a ground signal. This means that the relay K3 is not energized. Also, the gate 24 received at its input two high level signals causing a low at its output which illuminates the indicator light 25L (indicator I in FIG. 2). Thus, at this point in the operation the circuit is in a static state with pump action not having yet commenced.

Each side of the dispensing unit has its individual prime switch, such as the switch SW1 shown in FIG. 2. It also has an out-of-syrup light emitting diode or indicator I which glows red when the syrup sensor is empty of syrup, which occurs when the unit is at initial start-up. To start one side, with the syrup source properly connected, one presses the momentary contact prime switch such as switch SW1 (contacts 53 and 55 or 59 and 61 in FIG. 1B). This starts the pump motor 54 but shuts off the solenoid valve 56 so as not to prefill the bowl with water while the pump is pulling the syrup into the unit. When the syrup fills the syrup sensor, the LED I will go out. The button is released and the unit will fill both syrup and water.

Once the system is manually primed the out-of-syrup probe 23L is grounded by the syrup. This causes a low output from gate 18 and a high output from gate 22. This thus causes gate 20 to have two high inputs causing its output to go low or to the voltage level of −13 volts. This energizes the relay coil K3 so as to allow syrup pumping and water flow. Relays K2 and K3 each energize both a water flow solenoid and a peristaltic pump when the prime switch is released.

The aforementioned operation causes the liquid to rise in the tank 9 until the liquid contacts the low probe 17L. This causes a high logic level to be coupled to the gate 14 but this does not have any effect on the gate 14 because the other input to gate 14 from the output of gate 16 is low. Thus, the output of gate 14 remains at its high logic level state. This means that both inputs to the gate 20 are still at their high logic level state and thus the low level output from the gate 20 maintains the relay coil K3 energized. Thus, when the tank is being filled with liquid the contact of the low probe 17L in effect causes no action to be taken and the pumping simply continues.

It is to be noted that the fluid conductivity that the various probes measure is to "ground". This conductive path is provided by metallic tubing, cooling domes, and the fill tubes, so that there is, of course, a complete circuit path.

Now, when the high probe 19L is reached the input to the gate 12 goes to its high logic level state and the output of the gate 12 is thus at its low logic level state. This output couples to the gate 16 causing a high output from the gate 16. This high logic output couples back to the input of gate 14 and because the other input to gate 14 is also now high by virtue of the low probe being contacted previously, then the output of the gate 14 goes to its low state. This signal is coupled to the gate 20 for causing the output of the gate 20 to go to its high voltage level state (ground voltage). This de-energizes the relay oil K3. This in turn ceases the filling action as is desired.

When the output of the gate 12 goes to its low level state, this signal is also coupled to the gate 24 causing the output of gate 24 to go to its high state. This causes the LED 25 to cease illumination. The LED 25L illuminates only during the time that both inputs to the gate 24 are high which occurs before reaching the high probe and when out of syrup.

As the liquid is drawn from the tank the liquid level decreases ano the liquid level falls below the probe 19L.

When that occurs the output of the gate 12 goes high but again this has no effect on the gate 16 and thus the output of the gate 20 is still high maintaining the relay coil K3 de-energized. However, as the liquid level falls, the low probe 17L is eventually uncovered and thus the signal on line 17L to the gate 14 eventually goes low. This resets the bistable device comprised of gates 14 and 16 so that the output of gate 14 goes high. The other input to the gate 20 is also high and thus the output from gate 20 is low. This causes a re-energization of the relay coil K3, thus turning the liquid pump (and water solenoid) back on. They will remain on until the high probe is contacted, at which time the output of the gate 20 goes to its high state again de-energizing the relay coil K3. This action repeats itself and thus maintains the liquid level between the low probe 17L and the high probe 19L.

In addition to these two probes there is also provided an override probe 21L which couples to the corresponding terminal 21L. This input couples to the NAND gate 26 and the output of the NAND gate 26 couples to the base of transistor Q1 by way of resistor R6. The NAND gate 26 functions as an inverter as well as providing Schmitt trigger/driver action.

Normally, the top probe cap 21L is not contacted and thus the output of the gate 26 is high, maintaining the transistor Q1 in conduction. However, if due to a malfunction, the probe cap 21L is contacted, then the output of the gate 26 goes low and the transistor Q1 ceases conduction. The relay K1 is thus de-energized, removing power from the pump motors, solenoids, and logic circuitry.

The control circuit also has an input from the out of syrup sensor indicated at terminal 23L and coupling to the NAND gate 18, which also functions as a inverter. As long as there is syrup in the sensor block 106, the output of the gate 18 is low and the output of gate 22 in turn is high. The high output of gate 22 enables gate 20 and thus, as long as the system is not out of syrup, the relay K3 is capable of being energized in a selective manner under control from the output of the bistable device which comprises NAND gates 14 and 16 connected in a cross-coupled manner as illustrated.

In the event that the syrup reservoir runs out of syrup then the terminal 23L is no longer grounded and the input to the gate 18 is thus low. This causes a high output from gate 18 which is inverted by gate 22 to a low output. This low output to gate 20 over-rides the other input to gate 20 from the bistable device and causes a high output from the gate 20 which in turn de-energizes the relay K3. Thus, in accordance with the present invention there is provided for automatic interruption of any filling and pumping in the event that there is a detection that one is in an out-of-syrup state.

The operation of the control circuitry in connection with the right tank is substantially the same as the previous operation described in connection with the left tank. There can be considered at start-up that there is no liquid in the right tank or pump. Thus, each of the four liquid sensing probes associated with the right tank are ungrounded and thus input to each of the corresponding gates 32, 34, 38 and 26 is at its low level (−13 volts). The outputs of these gates are thus at their high level or logic "1" (0 volts). The high output from gate 34 cross-couples to one input from gate 36 and the output from gate 36 is thus low because both of its inputs are high. The high output from gate 34 also couples to gate 40. The high output from gate 38 is converted into a low output at the output of gate 42. This, in turn, causes a high output from the gate 40 which in this logic is a ground signal. This means that the relay K2 is not energized. Thus, at this point in the operation the circuit is in a static state with filling not having yet commenced.

Once the system is manually primed, the out-of-syrup probe 23R is grounded. This causes a low output from gate 38 and a high output from gate 42. This thus causes gate 40 to have two high inputs causing its output to go low or to the voltage level of −13 volts. This energizes the relay K2 so as to allow fluid pumping and fluid flow.

The aforementioned operation causes the liquid to rise in the tank 9 until the liquid contacts the low probe 17R. This causes a high logic level to be coupled to the gate 34 but this does not have any effect on the output of gate 34 because the other input to gate 34 from the output of gate 36 is low. Thus, the output of gate 34 remains at its high logic level state. This means that both inputs to the gate 40 are still at their high logic level state and thus the low level output from the gate 40 maintains the solenoid coil K2 energized. Thus, when the tank is being filled with liquid the contact of the low probe 17R in effect causes no action to be taken and the pumping simply continues.

Now, when the high probe 19R is reached the input to the gate 32 goes to its high logic level state and the output of the gate 32 is thus at its low logic level state. This output couples to the gate 36 causing a high output from the gate 36. This high logic output couples back to the input of gate 34 and because the other input to gate 34 is also now high by virtue of the low probe being contacted previously, then the output of the gate 34 goes to its low state. This signal is coupled to the gate 40 for causing the output of the gate 40 to go to its high voltage level state or to ground voltage. This de-energizes the solenoid coil K2. This in turn ceases the filling action as is desired.

When the output of the gate 32 goes to its low level state, this signal is also coupled to the gate 44 causing the output of gate 44 to go to its high state. This prevents the LED 25R from illuminating. The LED 25R illuminates when both of the inputs to the gate 44 are high which occurs before reaching the high probe and when out of syrup.

As the liquid is drawn from the tank the liquid level decreases and the liquid level falls below the probe 19R. When that occurs the output of the gate 32 goes high but now this has no effect on the gate 36 and thus the output of the gate 40 is still high maintaining the solenoid coil K2 de-energized. However, as the liquid level falls, the low probe 17R is eventually uncovered and thus the signal on line 17R to the gate 34 eventually goes low. This resets the bistable device comprised of gates 34 and 36 so that the output of gate 34 goes high. The other input to the gate 40 is also high and thus the output from gate 40 is low. This causes a re-energization of the relay coil K2. This thus turns the syrup pump and water solenoid valve back on and remains on until the high probe is contacted at which time the output of the gate 40 again goes to its high state again de-energizing the relay coil K2. This action repeats itself and maintains the liquid level thus between the low probe 17R and the high probe 19R.

In addition to these two probes there is also provided an over-ride probe 21R which couples to the left over-ride probe 21L and hence may be considered an extension of that probe, the function of which has already been discussed. Also, in connection with FIG. 1A it is noted that the gates identified as gates U1 and U3 are 4093 type NAND gates providing Schmitt trigger action. The other gates such as gates U2 and U4 are standard NAND gates which may be of type 4011. The latter gates are not directly connected to the probes.

The control circuitry depicted herein (particularly in FIG. 1B) also includes a high input power line 50 coupled by way of the power switch 52 to both left and right pumps and solenoids. With regard to the left tank, it is noted that there is provided a pump motor 54 and associated water solenoid valve 56 (see valve 140 in FIG. 5). Similarly, with regard to the right tank there is provided a pump motor 58 and associated water solenoid valve 60 (see valve 128 in FIG. 5). The motors 54 and 58 preferably drive peristaltic pumps (see the pumps 112 and 116 in FIG. 2) that are adapted to pump syrup and operate at a speed of 160 RPM. The water flow is controlled by a 1.0 GPM flow control device and requires 30–35 PSIG flowing pressure to operate.

Similar operation also occurs with regard to the right tank. In this regard it is noted that there is a contact 61 which is operated from the prime switch 59 and which is adapted to open the path to the solenoid 60 when the prime switch 59 is operated. When either of the prime switches 55 or 59 is de-activated, they being momentary switches, then the contact 53 or 61 reverts to its normally closed position and permits the operation of the respective solenoid.

The syrup is contained in a reservoir and flows through a syrup sensor which is the subject matter of a co-pending application Ser. No. 590,994, filed Mar. 19, 1984, now U.S. Pat. No. 4,645,095 The syrup is drawn past the syrup sensor by the peristaltic pump and from there is discharged into the bowl, above the beverage level. The out-of-syrup circuit allows the apparatus to run when the high resistance but conductive syrup conducts current from its sensor point through the syrup to ground. The sensor tip extends into the syrup flow and conducts current. When the syrup reservoir is empty, the syrup level drops in the sensor housing and the tip is no longer contacted by the syrup. It then no longer conducts and the logic controlling the system shuts down the apparatus.

With regard to the solenoid valves, they are adapted to deliver about two gallons per minute of water when both sides are filling. They use a ⅜ths inch OD copper line to connect to the machine. The water flow comes in from a main pipe and divides flowing through copper lines to the solenoid valves 56 and 60. From there the water flows through a flow control valve with its needle valve adjustment. From the water valve the water flows through a check valve and then through stainless steel tubing into the bowl or tank. Again, like the syrup line, the water line discharges water into the beverage bowl above the liquid level. With regard to the aforementioned FIG. 2 the line 15 may be for syrup and the line 13 for water.

In accordance with one of the important features of the present invention as highlighted previously, it is noted that the fill pipes 13 and 15 are disposed so that they extend above the probe assembly. This is clearly illustrated in FIG. 1 and even more so in FIG. 3. This prevents a back siphoning of beverage into the water line in case of a vacuum in the water line.

Having described one preferred embodiment of the present invention, it should now be apparent to those skilled in the art that numerous other embodiments and modifications thereof are contemplated as falling within the scope of the present invention as defined by the appended claims.

What is claimed is:

1. An automatic self-fill apparatus for a machine that dispenses a liquid comprised of water and a flavored concentrate syrup mixed with the water, said apparatus comprising;
   a tank that is adapted to be automatically filled with the liquid,
   a sensor member disposed in the tank in a position so as to be responsive to the rise and fall of liquid in the tank,
   pump means adapted to pump the syrup to the tank under selective control,
   water filling means for introducing water into said tank, said water filling means including a solenoid valve for controlling the flow of water to said tank,
   said sensor member having a low probe means for detecting a low predetermined level of liquid in the tank and a high probe means for detecting a high predetermined level of liquid in tank and adapted to respectively generate low and high probe signals,
   and control circuit means receiving and responsive to said low and high probe signals for controlling said pump means to operate when said low probe is uncovered and terminating said pump means operation when the liquid level reaches the high probe position,
   whereby the liquid level in the tank is maintained at a level between said low and high probes,
   said tank having at least one fill pipe for directing liquid to the tank,
   said sensor member comprising a post member and means supporting the post in an upright position in the tank and adjacent to the fill pipe,
   said probe means comprising a probe ring with the high probe ring disposed on the post member a spaced distance above the low probe ring,
   said control circuit means comprising a bistable logic gate device having one input for receiving the low probe signal and another input for receiving the high probe signal,
   whereby said bistable logic gate device assumes its operative state for operating said pump means only when both said high and low probe rings are uncovered,
   a relay for operating the pump means and means coupling the output of the bistable logic gate device to the relay for activation thereof,
   said bistable logic gate device comprises a pair of cross-coupled gates,
   said means coupling the output of the bistable device includes a NAND type gate,
   a sensor for determining when the machine is out-of-syrup for generating an out-of-syrup signal coupled to said NAND gate to close said solenoid valve and stop said pump means in the event that the machine is out of syrup,
   means for priming said pump means including control means that closes said solenoid valve to interrupt water flow during said priming so as not to dilute the liquid in the tank,
   a prime switch initially used to operate the pump means to prime the pump means with syrup and initiate automatic filling of said tank under control of said control circuit means.

2. An automatic self-fill apparatus as set forth in claim 1 wherein the dispensing machine has a pair of tanks each with a respective sensor member, pump means and water filling means and said means for priming includes a prime switch associated with each tank.

3. A filling apparatus for a machine that dispenses a liquid comprised of water and a flavored concentrate syrup mixed with the water, said apparatus comprising;
   a tank that is adapted to be filled with the liquid,
   a pump means adapted to pump the syrup to the tank under selective control,
   a pair of fill pipes associated with the tank, one for carrying water and the other for carrying said syrup,
   said fill pipes each having output port ends that introduce liquid flow into the tank at a top position thereof above the maximum desired predetermined liquid level in the tank,
   wherein each fill pipe extends substantially vertical with the output port therefrom disposed at a turn in the pipe at the top end thereof so as to at least partially direct the liquid downwardly therefrom,
   in combination with a sensor probe assembly and in which the fill pipes introduce liquid into the tank at a position just above the sensor probve assembly,
   said sensor probe assembly comprising a post member and means commonly supporting said fill pipes and post member in a vertically disposed, close-coupled array from the bottom of the tank,
   said means commonly supporting including an evaporator coil housing disposed at the bottom of the tank and having respective means for receiving the fill pipes and post member,
   wherein said sensor probe assembly includes a low probe means for detecting a low predetermined level of liquid in the tank and a high probe means for detecting a high predetermined level of liquid in the tank and adapted to respectively generate low and high probe signals, and control circuit means receiving and responsive to said low and high probe signals for controlling said pump means to operate when said low probe is uncovered and terminating said pump means operation when the liquid level reaches the high probe position, whereby the liquid level in the tank is maintained at a level between said low and high probes.

4. A filling apparatus as set forth in claim 3 wherein the dispensing machine has a pair of tanks each with a respective sensor probe assembly, pump means and water filling means.

5. A filling apparatus as set forth in claim 3 and including a third probe means disposed over the high probe means functioning as a system override, the control circuit means including means to be disabled to shut the apparatus down in the event of the liquid level reaching the third probe means.

6. A filling apparatus as set forth in claim 3 wherein the control circuit means comprises a bistable logic gate device having one input for receiving the low probe signal and another input for receiving the high probe signal.

7. A filling apparatus as set forth in claim 6 including a relay for operating the pump means and means coupling the output of the bistable device to the relay for activation thereof.

8. A filling apparatus as set forth in claim 7 wherein the bistable device comprises a pair of cross-coupled gates.

9. A filling apparatus as set forth in claim 8 wherein said coupling the output of the bistable device includes a NAND type gate.

10. A filling apparatus as set forth in claim 9 including a sensor for determining when the machine is out of syrup for generating an out of syrup signal coupled to said NAND gate to de-energize the pump means in the event that the machine is out of syrup.

11. A filling apparatus as set forth in claim 3 including means for priming said pump means including control means that interrupts water flow during said priming so as not to dilute the liquid in the tank, said means for priming including a prime switch.

12. An apparatus for controlling the filling of a machine that dispenses a liquid comprised of water and a flavored concentrate syrup mixed with the water, the apparatus comprising a tank that is adapted to be automatically filled with the liquid, a sensor member disposed in the tank in a position so as to be responsive to the rise and fall of liquid in the tank, pump means adapted to pump the syrup to the tank under selective control, and in which the sensor member has a low probe means for detecting a low predetermined level of liquid in the tank and a high probe means for detecting a high predetermined level of liquid in the tank and adapted to respectively generate high and low probe signals, a pair of fill pipes associated with the tank, one for carrying water and the other for carrying said flavored concentrate syrup, said fill pipes each having output port ends that introduce liquid flow into the tank at a top position thereof, said sensor member further including a post member and means commonly supporting said fill pipes and post member in a vertically disposed, close-coupled array from the bottom of the tank, said means commonly supporting including support means disposed at the bottom of the tank and having respective means for receiving the fill pipes and post member, said apparatus further including a control circuit comprising first input means for receiving the low probe signal, second input means for receiving the high probe signal, and bistable logic gate means coupled to the first and second input means, said bistable logic gate means adapted to assume its operative state for operating said pump means only when both said high and low probe means are uncovered, and means said bistable logic gate means including a bistable device having a pair of inputs and an output, said inputs receiving signals from said first and second input means, said control circuit further comprising a relay for operating the pump means and means coupling the output of the bistable device to the relay for activation thereof.

13. An apparatus as set forth in claim 12 wherein said control circuit includes means for sensing an override signal to disable the control circuit.

14. An apparatus as set forth in claim 12 wherein said bistable device comprises a pair of cross-coupled gates.

15. An apparatus as set forth in claim 14 including a sensor for determining when the machine is out-of-syrup for generating an out-of-syrup signal coupled to said bistable device to de-energize said solenoid and stop said pump means in the event the machine is out of syrup.

16. An apparatus as described in claim 12 wherein said bistable logic gate means further comprises a first logic gate having at least one input and an output, the logic gate input coupled to the output of the bistable device and the logic gate output coupled to said relay.

17. An apparatus as described in claim 16 wherein said bistable device comprises a pair of cross-coupled gates providing a flip-flop function.

18. An apparatus as described in claim 17 wherein said probe means each comprise a probe ring commonly supported on a post member, and further including a top ring over the high probe ring for providing an override function.

19. An apparatus as described in claim 18 including a sensor for determining when the machine is out-of-syrup for generating an out-of-syrup signal coupled to said first logic gate to de-energize said relay to stop further liquid pumping in the event the machine is out of syrup.

20. An apparatus as described in claim 19 including at least a second gate for receiving the out-of-syrup signal and coupling to the first logic gate.

21. An apparatus as described in claim 20 including a third logic gate coupled between the first and second logic gates.

22. An apparatus as described in claim 21 including a fourth logic gate and associated indicator, said fourth logic gate having a pair of inputs and an output.

23. An apparatus as described in claim 22 including a fifth logic gate for coupling the high probe signal to one input of the bistable device.

24. An apparatus as described in claim 23 wherein said fourth logic gate has one input coupled to the output of said second logic gate and has a second input coupled to the output of said fifth logic gate.

25. A filling apparatus for a machine that dispenses a liquid comprised of water and a flavored concentrate syrup mixed with the water, said apparatus comprising;
 a tank that is adapted to be filled with the liquid,
 a pump means adapted to pump the syrup to the tank under selective control,
 a pair of fill pipes associated with tank, one for carrying water and the other for carrying said syrup, said fill pipes each extending substantially vertically and each having an output port end for introducing liquid flow into the tank at a top position thereof,
 in combination with a sensor probe assembly and in which the fill pipes introduce liquid into the tank at a position vertically adjacent the sensor probe assembly,
 said sensor probe assembly comprising a post member and means commonly supporting said fill pipes and post member in a vertically disposed, close-coupled array from the bottom of the tank,
 said means commonly supporting including support means disposed at the bottom of the tank and having respective means for receiving the fill pipes and post member,
 wherein said sensor probe assembly includes a low probe means for detecting a low predetermined level of liquid in the tank and a high probe mens for detecting a high predetermined level of liquid in the tank and adapted to respectively generate low and high probe signals, and control circuit means receiving and responsive to said low and high probe signals for controlling said pump means to operate when said low probe is uncovered and terminating said pump means operation when the liquid level reaches the high probe position, whereby the liquid level in the tank is maintained at a level between said low and high probes.

26. A filling apparatus as set forth in claim 25 wherein the fill pipes have output port ends that introduce liquid flow into the tank above the maximum desired predetermined liquid level in the tank.

27. A filling apparatus as set forth in claim 25 wherein each fill pipe has the output port therefrom disposed at a turn in the pipe at the top end thereof so as to at least partially direct the liquid downwardly therefrom.

28. A filling apparatus as set forth in claim 25 wherein said support means comprises an evaporator coil housing disposed at the bottom of the tank for supporting the fill pipes and post member.

29. A filling apparatus as set forth in claim 25 including a pair of tanks each with a respective sensor probe assembly.

30. A filling apparatus as set forth in claim 25 further including a third probe means disposed over the high probe means and functioning as a system override, said control circuit means including means to be disabled to shut the apparatus down in the event of the liquid level reaching the third probe means.

31. A filling apparatus as set forth in claim 25 wherein said control circuit means comprises a bistable device having one input for receiving the low probe signal and another input for receiving the high probe signal.

32. A filling apparatus as set forth in claim 31 wherein said bistable device assumes its operative state for operating said pump means only when both said high and low probe means are uncovered.

* * * * *

UNITED STATES PATENT AND TRADEMARK OFFICE
CERTIFICATE OF CORRECTION

PATENT NO. : 4,728,005

DATED : March 1, 1988

INVENTOR(S) : Leonard Jacobs, William Arzberger, Peter Coppola, and Thomas A. O. Gross It is certified that error appears in the above-identified patent and that said Letters Patent is hereby corrected as shown below:

Column 14, Claim 25, line 15, delete "vertically".

Signed and Sealed this

Sixth Day of September, 1988

Attest:

DONALD J. QUIGG

*Attesting Officer*  *Commissioner of Patents and Trademarks*